June 9, 1942. O. J. POUPITCH Re. 22,110

GEAR TESTING AND RECORDING MACHINE

Original Filed Sept. 1, 1938 6 Sheets-Sheet 1

INVENTOR.
Ouglješa Jules Poupitch
BY: Cox & Moore
ATTORNEYS.

June 9, 1942. O. J. POUPITCH Re. 22,110
GEAR TESTING AND RECORDING MACHINE
Original Filed Sept. 1, 1938 6 Sheets-Sheet 2
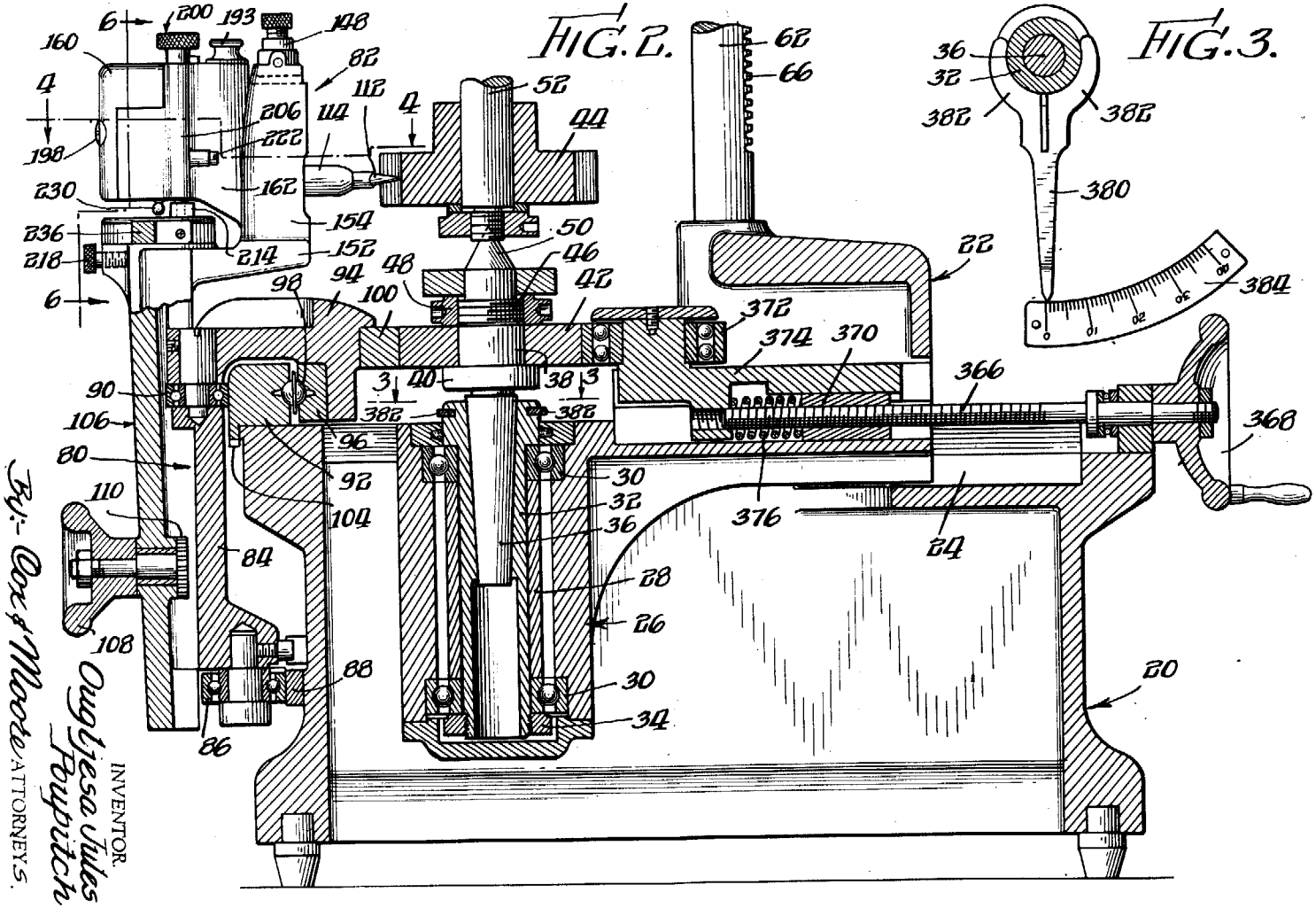
INVENTOR.
Ouglješa Jules Poupitch
By:- Cox & Moore ATTORNEYS.

June 9, 1942. O. J. POUPITCH Re. 22,110
GEAR TESTING AND RECORDING MACHINE
Original Filed Sept. 1, 1938 6 Sheets-Sheet 3
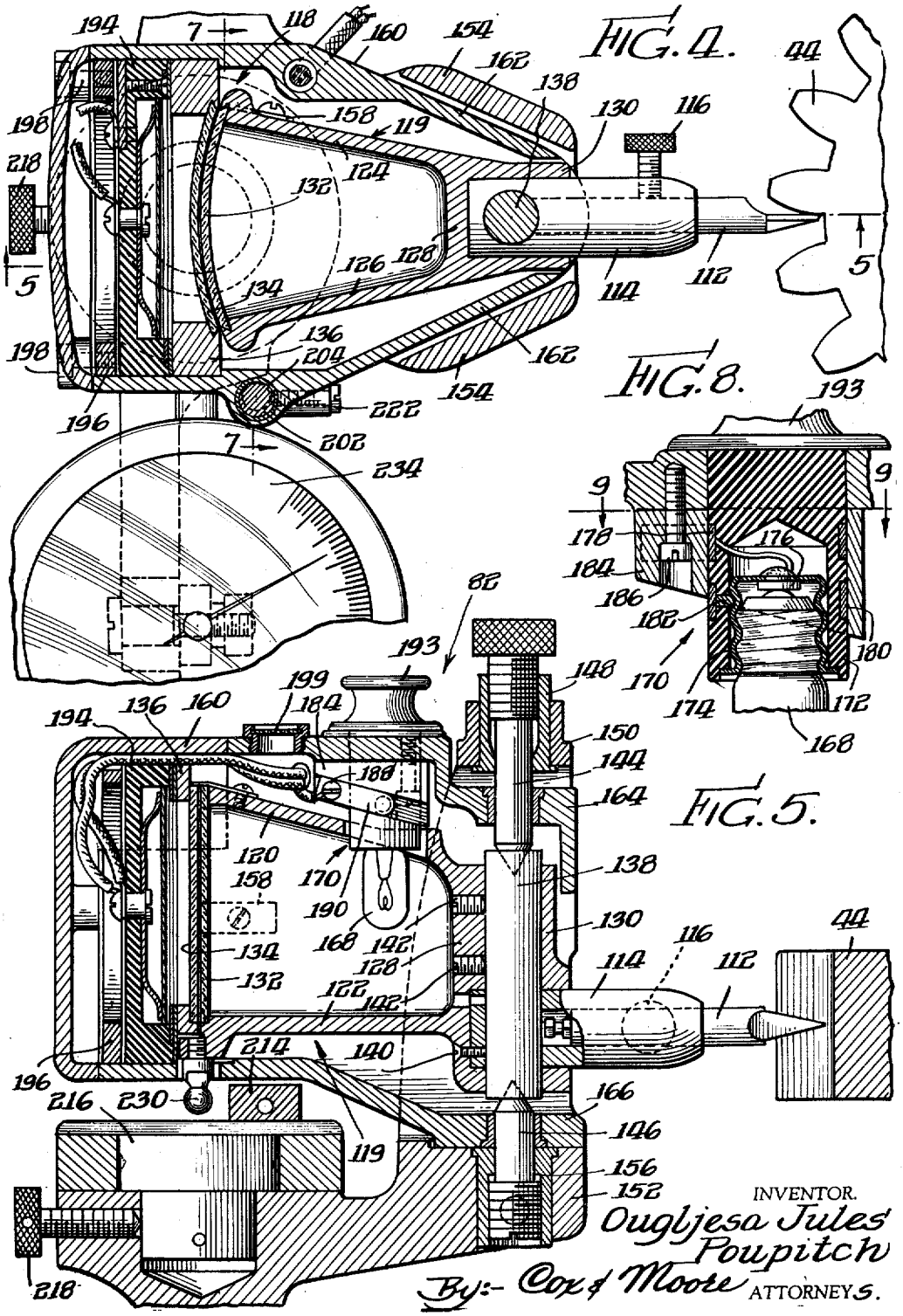

GEAR TESTING AND RECORDING MACHINE
Original Filed Sept. 1, 1938 6 Sheets-Sheet 4
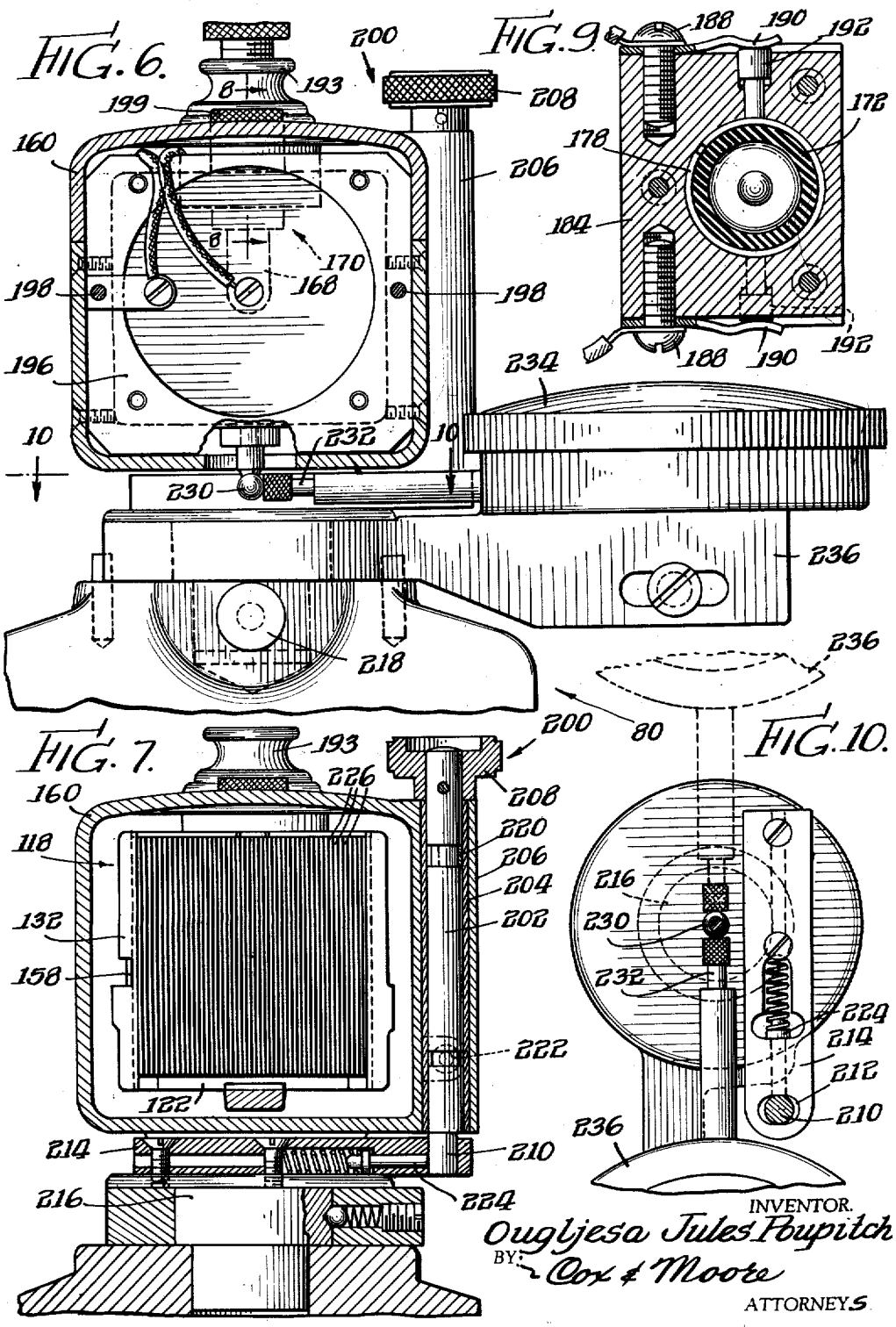
INVENTOR.
Ouglješa Jules Poupitch
BY: Cox & Moore
ATTORNEYS.

GEAR TESTING AND RECORDING MACHINE
Original Filed Sept. 1, 1938 6 Sheets-Sheet 5
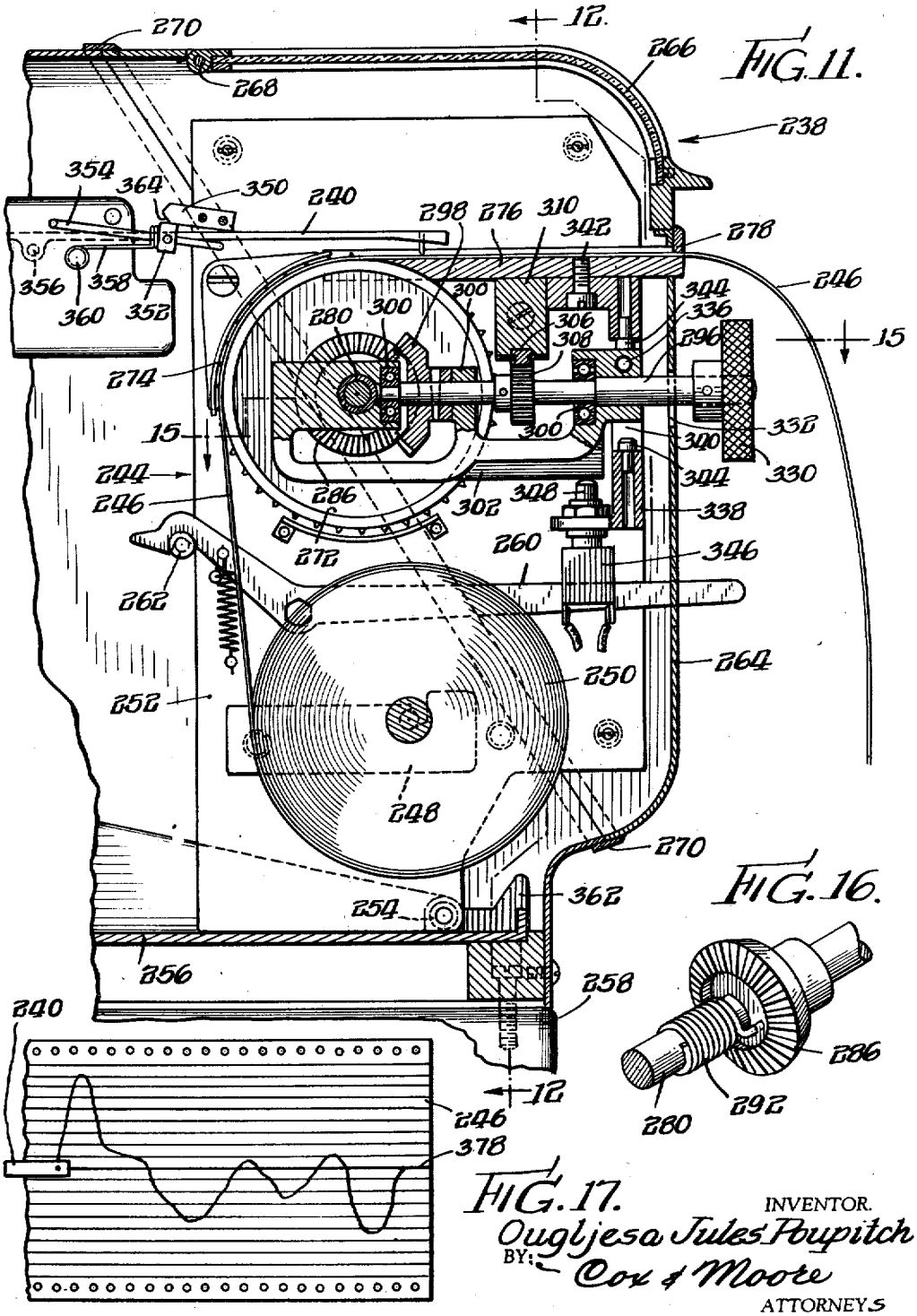
INVENTOR.
Ouglješa Jules Poupitch
BY: Cox & Moore
ATTORNEYS GEAR TESTING AND RECORDING MACHINE
Original Filed Sept. 1, 1938 6 Sheets-Sheet 6
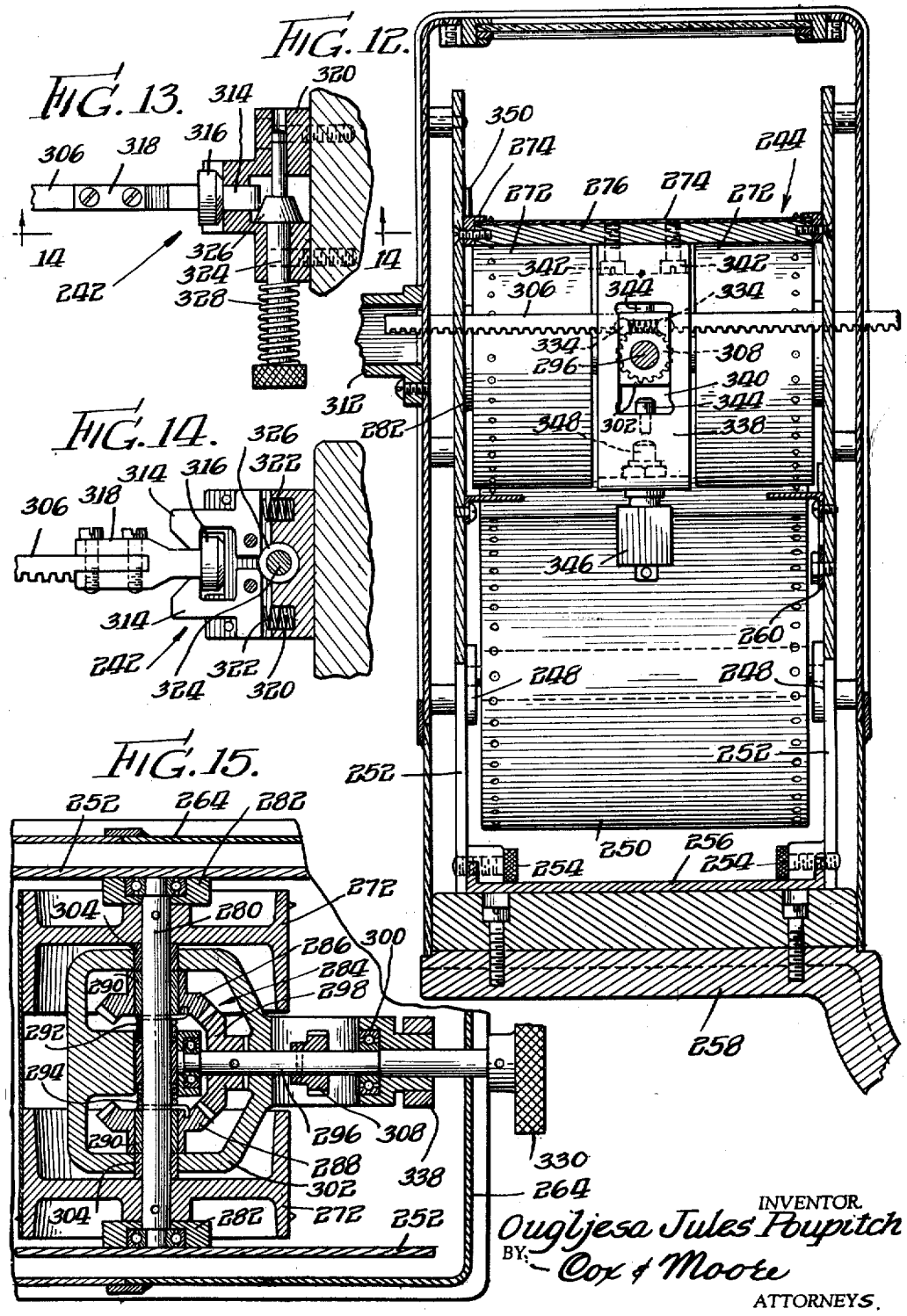

Reissued June 9, 1942

Re. 22,110

UNITED STATES PATENT OFFICE 22,110

GEAR TESTING AND RECORDING MACHINE

Ouglijesa Jules Poupitch, Chicago, Ill., assignor to Illinois Tool Works, Chicago, Ill., a corporation of Illinois Original No. 2,206,853, dated July 2, 1940, Serial No. 227,944, September 1, 1938. Application for reissue July 1, 1941, Serial No. 400,698

13 Claims. (Cl. 33—174)

This invention relates to an involute test and recorder.

It is an object of this invention to provide a compact, inexpensive, efficient and highly sensitive involute tester and recorder capable of use without special instruction or training and providing means by which the accuracy of the data taken shall be independent of the skill or lack of skill of the operator making the test.

Another object is to provide a tester and recorder of the above stated character in which means are provided for controlling the feeding movement of a record sheet by the movement of the testing instrumentality and simultaneously therewith, said means being so designed as to effect the feeding of the record sheet in the same direction independent of the direction of movement of the testing instrumentality.

Applicant's invention further contemplates the provision of an electro-optical, involute tester and recorder embodying ray-controlling means operable in response to the minutest deflection of the work piece from the involute curve to effect an accurately proportioned variation in the quantum of rays falling upon a ray sensitive electric cell.

A more specific object is to provide in such an electro-optical, involute tester and recorder complementary arcuate ray controlling screens, grids or gratings relatively adjustable in a simple and expeditious manner to determine the zero or midpoint of the tester and the base line or abscissa of the recorded curve, at least one of these screens being mounted for a substantially frictionless deflection in response to a deviation of the work piece from the involute curve and the other screen being mutually concentric with the first screen to the point origin of the rays so that upon deflection every unit area of the ray beam passing through the screens will be equally varied and this variation will be precisely proportioned to the amount of deviation of the work piece from the involute curve.

A further object of the invention is to provide a testing or control unit that may be used for recording instruments of various types such, for example, as for testing hobs and gears and for any other purpose for which the relatively swinging arcuate screens may be functionally adapted, such as for the remote control of airplanes, ships and the like, and as part of height and depth measuring instruments.

Other objects and advantages will be apparent from the following detailed description when considered in connection with the accompanying drawings wherein:

Fig. 2 is a vertical section taken substantially along the line 2—2 of Fig. 1.

Fig. 3 is a fragmentary view in horizontal section along the line 3—3 of Fig. 2.

Fig. 4 is a fragmentary horizontal section taken along the line 4—4 of Fig. 2.

Fig. 5 is a fragmentary view in vertical section taken along the line 5—5 of Fig. 4.

Fig. 6 is a fragmentary vertical section taken along the line 6—6 of Fig. 2.

Fig. 7 is a fragmentary vertical section taken along the line 7—7 of Fig. 4.

Fig. 8 is a fragmentary vertical section along the line 8—8 of Fig. 6.

Fig. 9 is a fragmentary horizontal section along the line 9—9 of Fig. 8.

Fig. 10 is a fragmentary horizontal section along the line 10—10 of Fig. 6.

Fig. 11 is a fragmentary vertical section through the recorder taken along the line 11—11 of Fig. 1.

Fig. 12 is a fragmentary vertical section taken along the line 12—12 of Fig. 11.

Fig. 13 is a fragmentary horizontal section through a portion of the mechanism connecting the recorder to the tester head and is taken along the line 13—13 of Fig. 1.

Fig. 14 is a fragmentary view in elevation and partly in section taken along the line 14—14 of Fig. 13.

Fig. 15 is a fragmentary horizontal section along the line 15—15 of Fig. 11.

Fig. 16 is a detail perspective view of a portion of the record sheet drive means.

Fig. 17 is an illustrative view of a record sheet provided by the machine of the invention.

Figures 1, 18:
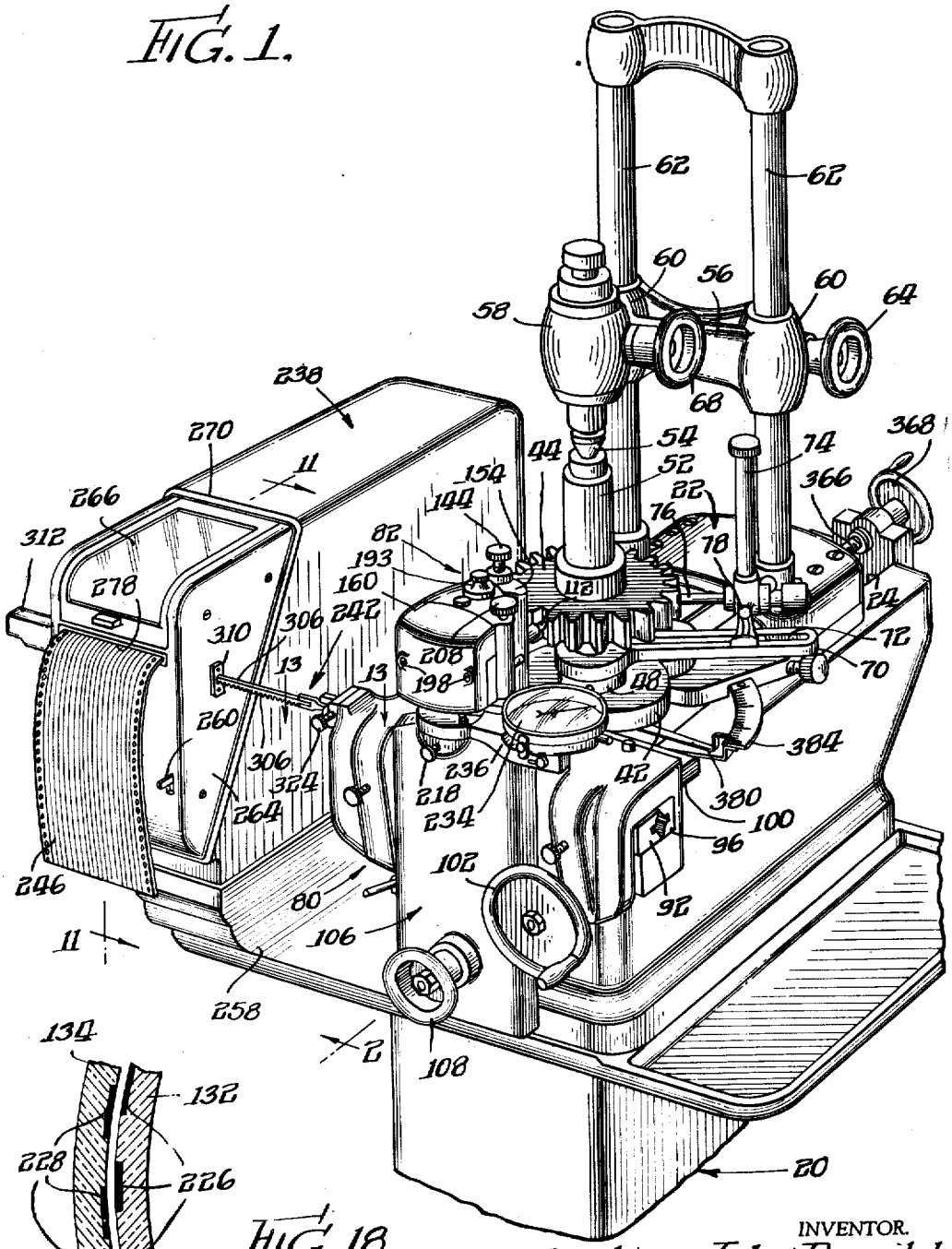
Fig. 1 is a view in perspective of an involute testing and recording machine which is representative of one embodiment of the invention.
Fig. 18 is a diagrammative illustration of the ray controlling members.

Referring now to the drawings more in detail, it will be seen that a machine forming one embodiment of the invention includes a suitable base 20. Mounted upon the upper portion of the base 20 is a slide frame 22. This frame 22 is slidable upon horizontal ways or tracks 24 provided along the upper edge of the base 20 (Fig. 2). The frame 22 is formed with a depending section 26 in which is journaled a sleeve 28, the sleeve 28 being retained between frictionless bearings 30. A sleeve 32 is journaled in the bearings 30 and the sleeve 28, and the sleeve 32 is provided at its upper end with an enlarged portion retaining the upper bearing 30 in position and at its lower end receives a nut 34 which retains the lower bearing in position.

The sleeve 32 receives the tapered shank 36 of a spindle 38, which spindle is provided with an annular flange 40 which forms a support for a cylindrical member, ring or disk 42 which is of an external diameter equal to the diameter of the base circle of a gear 44 to be tested. The disk 42 therefore constitutes in effect a base cylinder for the gear to be tested and is accordingly detachably mounted on the spindle 38 so that it may be readily replaced by a similar disk of different size corresponding to a different size gear to be tested. The spindle 38 is therefore threaded as at 46 adjacent its upper end to receive a clamping nut 48 by which the disk is retained in position on a supporting flange 40.

The spindle 38 terminates at its upper end in a conical work supporting center 50, which receives the lower end of the gear or work supporting spindle 52. The upper end of the spindle 52 is received by the center 54 (Fig. 1) which is carried by its tailstock 56, which tailstock includes a housing 58 for the spindle which supports the center 54 and a pair of diverging arms which terminate in sleeves 60. These sleeves 60 are slidable upon vertical posts or columns 62 and are adjustable vertically of the columns by a hand-wheel which controls a gear having meshing engagement with the rack teeth 66 (Fig. 2) formed on one or both of the columns 62. The center 54 is adjustable with the spindle and relative to the housing 58 in a similar manner by means of a hand-wheel 68. The columns 62 are carried by the frame 22.

The base cylinder 42 is coupled to the gear 44 to be tested by a lever 70 which is detachably clamped to the spindle 38 in any suitable conventional manner and the arm of this lever is slotted as at 72 to receive a post or rod 74, which, in any suitable manner, is clamped to the lever for adjustment along the slot 72. The post 74 supports for vertical adjustment relative thereto a pin or rod 76 which may be clamped on the post 74 by means of a set screw 78 carried by the supporting yoke for the pin 76. The pin 76 projects between adjacent teeth of the gear to be tested as shown in Fig. 1.

The base cylinder retaining nut 48 in clamping the base cylinder on the spindle 38 also couples the spindle and cylinder for simultaneous rotation and hence the rotation of the base cylinder will be imparted to the gear to be tested through the nut 48, the spindle 38, the lever 70, the post 74 and the pin 76.

A supporting frame 80 for a testing instrumentality or device 82 is slidably mounted upon the front end of the base 20. The frame 80 is provided with a depending portion 84 to which is secured at its lower end a roller bearing 86 which rolls along the flat surface of a plate or bar 88 secured to the base 20. A similar roller bearing 90 is secured to the upper portion of the frame 80 and this bearing rolls along the forward surface of a bar 92 secured to the upper edge of the base 20. The frame 80 is additionally formed with a rearwardly extending portion or section 94 overlying the bar 92 and extending downwardly behind the same. In its downward extension the section 94 carries a bar 96 in horizontal alinement with the bar 92 and between this bar 96 and the bar 92 are interposed a plurality of antifriction ball bearings.

A bar 100 is secured to the section 94 of the frame 80 and is provided with a friction surface to engage the peripheral surface of the base cylinder 42 and accordingly when the bar 100 is moved horizontally with the frame 80 rotation is imparted to the base cylinder 42.

The frame 80 is moved horizontally by means of a handwheel 102 (Fig. 1) which controls a system of gears (not shown), the end gear of which meshes with the rack teeth 104 (Fig. 2) provided along the underside of the stationary bar 92.

An auxiliary frame 106 forms part of the frame 80 and is slidably mounted in suitable ways formed on the downward extension 84 (Figs. 1 and 2). Vertical adjustment of the auxiliary frame 106 is accomplished by a handwheel 108 which controls the rotation of a gear 110 which in turn meshes with rack teeth (not shown) formed on the downward extension 84 of the frame 80.

The testing instrumentality or device 82 is secured to the upper end of the auxiliary frame or slide 106. This instrumentality comprises a contactor 112 adjustably mounted in a block or tube 114 and retained in adjusted position therein by a set screw 116 (Figs. 4 and 5). The contactor 112 is adapted to engage the involute toothed surfaces of a gear to be tested at the point of intersection of the base circle with the toothed surfaces and is adapted to control the deflection of a ray controlling member or means 118. The latter member or means comprises a lamp receiving housing formed by an inclined top wall 120, a substantially horizontal wall 122, diverging side walls 124 and 126 and an end wall 128 formed integrally with a mounting boss 130 (Figs. 4 and 5).

The lamp receiving housing is open at one end and this end is arcuate in cross section (as seen in Fig. 4), the side and bottom walls forming at this end of the housing a frame to receive an arcuate ray controlling grid, grating screen or the like 132. The screen 132 preferably comprises a sector of plate glass etched on its outer surface with lines .001 of an inch in width spaced .001 of an inch apart. The screen, grid or grating 132 cooperates with a similar arcuate screen, grid or grating 134 mounted in a frame 136, the screen 134 being preferably formed from a piece of plate glass etched on its inner surface with lines of the same width and spacing as the lines on the screen 132.

The mounting boss 130 for the ray controlling member or means 118 is apertured to receive a pivot pin or stud 138 and to receive the block or tube 114. The block 114 is secured to the boss 130 as by a screw 140 and the boss is secured to the stud 138 as by set screws 142. The stud 138 is mounted between adjustable centers 144 and 146. The center 144 is adjustably mounted within a sleeve 148 secured to the horizontally extending arm 150 of a bracket 152 having spaced vertically extending arms 154, the bracket 152 being formed integrally with or secured to the auxiliary frame 106. The center 146 is adjustably mounted in a sleeve 156 secured to the base of the bracket 152.

The arcuate screens 132 and 134 are preferably concentric to the axis of the pivot stud 138 so that as the contactor 112 is deflected in response to the deviations of a toothed surface from the true involute curve, the screens 132 and 134 will cooperate to vary the amount of light passed therethrough in strict proportionality to the deflection of the contactor.

The screen 132 is preferably mounted in the frame formed by the outer end of the lamp housing 119 by a dovetail fit therein and is preferably resiliently held therein by a spring, catch or the like 158 secured to a side wall of the lamp housing and passing through a longitudinally extending opening in the frame defining portion of the housing into engagement with an edge of the screen 132. Accordingly, any looseness in the fit of the screen 132 is compensated by the spring 158.

A housing or casting 160 is provided for the ray controlling member or means 118. This housing is provided with forwardly extending side walls 162 which inclose the lamp housing 119, and forwardly extending top and bottom walls which are apertured to receive the centers 144 and 146 so that the housing 160 is pivotally supported for adjustment relative to the contactor 112 and the screen 132 about the coincident pivot axis of said contactor and said screen.

A lamp or ray source 168 is mounted upon the top wall of the housing 160 and extends into the lamp housing 119 through an enlarged opening in the top wall 120 of this housing 119. The lamp 168 is received within a socket 170 which preferably comprises (as best shown in Figs. 8 and 9) an insulating cylinder 172 having secured internally thereof a screw threaded contact shell 174, the shell 174 carrying a contact button 176 which is insulated from the shell and positioned to engage the central contact projection of the lamp.

The insulating cylinder 172 is provided with contact rings 178 and 180 recessed into the outer surface thereof, the contact ring 178 being connected to the contact button 176 by a suitable wire and the contact ring 180 being connected to the shell 174 by a pin or the like 182 passing through the cylinder 172. The insulating cylinder 172 is secured to an insulating block 184 which in turn is secured as by screws 186 to the top wall of the housing 160. The insulating block 184 is provided with wire receiving terminals or screws 188 (Fig. 9) which in turn are connected to the contact rings 178 and 180 by resilient contact blades 190 engaging the outer ends of metal plungers 192 mounted in the insulating block 184 and engaging at their inner ends the contact rings 178 and 180.

It will be seen from Figs. 8 and 9 that the insulating cylinder 172 together with the lamp 168 may be readily removed from the housings 119 and 160 by pulling upwardly upon a flanged knob 193 (Fig. 5). It should also be noted that the internal surface of the end wall 128 of the housing 119 is, in any suitable manner, made light reflecting in character so as to direct the rays of light from the lamp 168 by reflection upon the screen 132.

An electro-optical cell 194 (Figs. 4 and 5) is mounted within the housing 160 between the mounting frame 136 for the screen 134 and a retaining frame 196 secured to the rear wall of the housing as by screws or the like 198. The electro-optical or photo-electric cell 194 is preferably of a self-generating type similar in principle to the type now widely used as photographic photometers by amateur photographers. These devices being well known, no detailed description thereof is deemed necessary but it suffices to note that the electric current generated by such devices varies in strict proportionality with the amount of ilumination or quantum of rays to which they are subjected.

The top wall of the housing 160 is provided with a window 199, preferably of colored glass, by which the interior of the housing may be inspected to determine the operability of the lamp 168 before any test is initiated.

Means 200 are provided for micrometrically adjusting the housing 160 and hence the screen 134 relative to the screen 132. This means comprises a stud or pin 202 (Figs. 4 and 7) journaled by a sleeve 204 (Fig. 7) in a boss 206 formed on the housing 160. The stud 202 is provided at its upper end with an adjusting knob 208 secured thereto and at its lower end is provided with an eccentric pin 210. The eccentric pin 210 is received within a slot 212 (Fig. 10) in a fixed plate 214 secured to the flanged head of a stud 216 secured to the bracket 152 as by a set screw 218 (Fig. 5). The width of the slot 212, in a horizontal direction transverse to the screens 132 and 134 and the contactor 112, is substantially equal to the diameter of the eccentric pin portion 210 but is of a length greater than the diameter of this eccentric pin portion for a purpose which will presently appear.

The stud 202 is frictionally retained against inadvertent rotation by a spring strip 220 (Fig. 7) bearing at its opposite ends against the inner walls of the sleeve 204 and at an intermediate point against a reduced portion of the stud.

A set screw 222 (Figs. 4 and 7) is carried by the housing 160 and extends between shoulders formed by a second reduced portion of the stud 202 so as to retain this stud against vertical displacement. A spring pressed pin 224 mounted within the fixed plate 214 engages the eccentric pin portion 210 and frictionally retains the same in its adjusted position in the slot 212.

The screen 134 is adjusted relative to the screen 132 to a zero position in which the etched and therefore light opaque lines of the screens are relatively disposed as diagrammatically shown in Fig. 18 when the point of the contactor is in engagement with a true involute surface. As shown in Fig. 18, in this zero position of adjustment the etched lines 226 of the screen partially overlap the etched lines 228 of the screen 134 and cover one-half the space between the etched lines 228. Movement of the screen 132 relative to the screen 134 in one direction therefore effects an increase in the amount of illumination or quantum of rays transmitted to the screens, whereas movement of the screen 132 in thes opposite direction effects a decrease in the amount of illumination or quantum of rays so transmitted.

In adjusting these screens to this position, the stud 202 is rotated by the knob 208 and the eccentric pin portion 210 in being rotated about the offset axis of the stud 202 while being held against transverse movement in the slot 212 causes movement of the housing 160 and the screen 134 relative to the screen 132. The elongation of the slot 212 prevents adjusting movement of the housing 160 and the screen 134 in a direction which could cause a variation in the spacing between this screen and the screen 132.

The bottom wall 122 of the lamp housing 119 provides the support for a spherical element or knuckle 230 (Figs. 5 and 6). The spherical element 230 engages the plunger 232 of a dial indicator 234. The dial indicator 234 is mounted upon an arm 236 which swivels about the vertical axis of the stud 216, which vertical axis is coincident with the center of the spherical element 230. The dial indicator may therefore be reversed from the position shown in Fig. 6 to contact the opposite side of the spherical element 230 so that the dial indicator may be moved to the most appropriate position for different types and sizes of work pieces.

The electro-optical or photo-electric cell 194 is connected to an electric recorder unit 238 (Fig. 1). This recorder unit may be of any well known conventional structure embodying an amplifier, which, in a conventional manner, may be connected to the photo-electric cell and to a meter controlled by the amplifier, the meter providing a recording scriber or pen 240 as shown in Fig. 11. Preferably the recorder unit 238 is a "Pilotel recorder" marketed by a well known manufacturer of electrical instruments. Further detailed description of this recorder unit is therefore deemed unnecessary.

Means 242 (Fig. 1) are provided for connecting the auxiliary frame 80 to a mechanism 244 (Figs. 11 to 16) for feeding a sheet 246 of recording paper past the scriber 240 as the auxiliary frame 80 is shifted to cause the contactor 112 to traverse the involute surface of a tooth of a gear being tested.

The paper feed mechanism 244 includes spaced brackets 248 (Figs. 11 and 12) for receiving a roll of paper 250 to be fed. The brackets 248 are secured to spaced supporting plates 252 pivoted as by bolts 254 to the base plate 256 of the recorder unit 238, the recorder unit being mounted on the supporting pan or base 258 secured to the main base 20.

The spaced plates 252 are maintained in vertical position (as shown in Fig. 11) by means of a spring pressed latch lever 260 pivoted to one of said plates and engageable with the fixed pin 262 secured to and projecting inwardly from one of the side walls of the housing for the recorder unit 238. The latch lever 260 projects forwardly through an opening in the front wall of a housing 264 which encloses the paper feed mechanism 244. The housing 264 is provided with a transparent window or pivoted cover 266 pivoted as at 268 for vertical movement to expose the record sheet. The housing 264 is detachably mounted on the housing for the recorder unit as by an encircling strap 270 secured to the housing 264 and adapted to overlie the meeting edges of the recorder unit housing (as shown in Fig. 11).

Paper is fed from the roll 250 by means of feed rolls 272 which are preferably provided with sprocket teeth engaging the sprocket holes in the sheet of paper being fed. An arcuate guide plate 274 overlies a portion of the rolls 272 to maintain the paper in proper engagement with the sprocket teeth of these rolls. The paper is fed by these rolls onto and past a substantially horizontal paper supporting track or guide 276 secured to the spaced supporting plates 252. This track 276 extends forwardly slightly beyond the front wall of the housing 264 and its forward, outer end is provided with a cutting edge 278 by which a section of paper may be severed from the roll. The paper feed rolls 272 are secured to a common shaft 280 journaled in bearing brackets 282 (Fig. 15) secured to the spaced plates 252. The shaft 280 is driven through a selective clutch mechanism 284 (best shown in Figs. 15 and 16).

This selective clutch driving mechanism preferably comprises opposed bevel gears 286 and 288 journaled on the shaft 280 by bushings 290. The gear 286 is adapted to be connected to the shaft 280 by a clutch spring 292 having a plurality of convolutions closely encircling or fitting about the shaft 280 with one end of the spring being connected to the hub of the bevel gear 286 (as best shown in Fig. 16). The bevel gear 288 is adapted to be connected to the shaft 280 by a clutch spring 294 similar to the spring 292 but wound in the opposite direction. A driving shaft 296 carries a bevel gear 298 meshing with both of the bevel gears 286 and 288.

The driving shaft 296 is journaled in spaced bearings 300 carried by, or formed integrally with, a bracket 302 pivoted on the shaft 280 as by bushings 304.

The means 242 for connecting the auxiliary frame 80 on the paper feed mechanism 244 preferably comprises a rack bar 306 (Figs. 11 to 14) detachably secured at one end to the auxiliary frame and projecting therefrom through the housing 264 into meshing engagement with a gear 308 secured to the paper feed driving shaft 296. The rack bar is slidably supported by one or more guide brackets 310 secured to the side walls of the housing 264 or to the spaced plates 252. A housing 312 for the projecting end of the rack bar 306 is secured to the far side of the housing 264.

The rack bar 306 is detachably secured to the auxiliary frame 80 by a pair of fingers or latches 314 adapted to engage the flanged end 316 of a bifurcated bar or claw 318 secured to the end of the rack bar. The fingers or latches 314 are pivoted to a bracket 320 secured to the auxiliary frame 80 and are normally urged by springs 322 into latching engagement with the flanged end 316 of the claw 318. A manually operable plunger 324 is mounted in the bracket 320 and is provided with a frustoconical cam 326, which, upon depression of the plunger 324, engages the latches 314 and pivots them in opposite directions to release the rack bar from the auxiliary base. A coil spring 328 normally retains the plunger in inoperative position.

It will be apparent that as the rack bar is moved to the right in Fig. 1 in response to the shifting of the auxiliary base 80, the driving shaft 296 of the paper feed mechanism will be driven in a clockwise direction as viewed from the right of Figs. 11 and 15. This clockwise rotation of the driving shaft 296 causes simultaneous rotation of the bevel gears 286 and 288 in opposite directions, the gear 288 being driven in a counterclockwise direction and the gear 286 being driven in a clockwise direction as viewed from the bottom of Fig. 15. The clockwise rotation of the gear 286 causes a tightening of the convolutions of the spring 292 about the shaft 280 and accordingly the gear 286 frictionally drives the shaft in a clockwise direction. Counterclockwise rotation of the gear 288 causes an unwinding of the spring 294 and accordingly the gear 288 and the spring 294 are free to rotate relative to the shaft 280 and in a direction opposite thereto.

As the rack bar 306 is moved to the left in Fig. 1, the driving shaft 296 is driven in a counterclockwise direction as viewed from the right of Figs. 11 and 15. Accordingly the gear 286 is driven in a counterclockwise direction and the gear 288 is driven in a clockwise direction as viewed from the bottom of Fig. 15. Clockwise rotation of the gear 288 causes a tightening of the convolutions of the spring 294 about the shaft 280 and the shaft is therefore frictionally driven in a clockwise direction by the gear 288. Counterclockwise rotation of the gear 286 of course causes an unwinding of the spring 292 and hence the gear and spring are free to rotate relative to the shaft 280 and in an opposite direction with respect thereto. It will be seen therefore from this description that the paper feed rolls 272 are driven in the same direction regardless of the direction of movement of the rack bar 306 and the auxiliary frame 80 to feed the recording paper in the same direction past the recording scriber or pen 240 as the testing contactor is moved to and fro across the involute surface being tested.

Means are provided for disconnecting the driving shaft 296 from the rack bar 306 during preliminary adjustment of the testing machine and whenever a recording of the test may not be desired. This means comprises a manually operable knob or the like 330 secured to the driving shaft 296 which for this purpose is extended outwardly beyond the front wall of the housing 264, the shaft 296 passing through an elongated slot 332 (Fig. 11) in said housing. The bracket 302 being pivoted for movement about an axis coincident with the axis of the shaft 280, it will be apparent that upon depression of the knob 330 the driving shaft will be revolved about the axis of the driving shaft 296 and with its gear 298 will be revolved about the axis of the shaft 280 to thereby disengage the gear 308 from the rack 306. The shaft 296 is frictionally retained in its uppermost position, in which position the gear 308 meshes with the rack 306, by means of a pair of spring pressed balls or the like 334 (Fig. 12) mounted in an opening 336 (Fig. 11) at the forward end of the bracket 302. The spring pressed balls 334 are adapted to engage opposed notches in a plate 338 slotted as at 340 to receive the forward end of the bracket 302. The plate 338 is secured as by bolts 342 to the paper supporting track 276. Stops 344 secured to the plate 338 limit the movement of the bracket 302.

A switch 346 (Figs. 11 and 12), operable by a spring pressed plunger 348, is mounted on the plate 338 in a position such that the plunger will be engaged and depressed by the bracket 302 when the knob 330 is depressed. The switch 346 in a conventional manner controls the energization of the electric recorder unit 238 so that upon the connection of the paper feed mechanism 244 and the testing instrumentalities, the recorder unit will be electrically energized.

Means are provided for raising the recording scriber or pen 240 when the supporting plates 252 of the paper feed mechanism 244 are moved forwardly relative to the recorder unit to insert or remove a roll of paper so that the recording scriber or pen will not be injured by the paper supporting track 276 and the paper will not be marred or torn by the scriber. This means comprises a cam 350 secured to a plate 252 and adapted to engage a collar 352 carried by one of the legs of the needle lifting lever or wire 354 which forms part of the electric meter of the recorder unit, the needle or scriber of this standard meter being in two sections pivoted to each other as at 356 to permit such raising and lowering of the recording scriber or pen. A spring 358 is secured at one end to a fixed point 360 and its other end engages one of the legs of the needle lifting lever 354 so as to normally urge this lever in an upward direction (as seen in Fig. 11) whereby to raise the recording scriber. The cam 350 in engaging the collar 352 maintains the needle lifting lever in its lower position against the action of the spring 358.

It will be seen therefore that as the housing 264 with the spaced supporting plates 252 is moved to open position to insert or remove a roll of paper, the cam 350 will move out of engagement with the collar 352 and the spring 358, acting through the needle lifting lever 354, will move the recording scriber vertically out of engagement with the paper or its supporting track. Forward movement of the housing 264 is limited by a fixed stop 362 adapted to engage the forward edge of a supporting plate 252. In order to move the recording scriber automatically into engagement with the paper on its supporting track 276 as the housing 264 is moved to closed position, the cam 350 is provided with a bevel cam face 364 adapted to engage and move the collar 352 and hence the needle lifting lever 354 downwardly against the action of the spring 358.

In order to make a test, the machine is adjusted as follows: The slide frame 22 is first adjusted relative to the main base 20 and to the supporting frame 80 to receive a cylinder or disk 42 of an external diameter equal to the base circle of the gear which is to be tested. This adjustment is accomplished by a feed screw 366 (Fig. 2) supported on the main base 20 and operated by a handwheel 368, the feed screw engaging a threaded block 370 secured to the slide frame 22. A base cylinder 42 of the appropriate size is mounted on, and clamped to, the spindle 38 and the slide frame is adjusted to bring the cylinder into engagement with the frictionally driving bar 100 carried by the supporting frame 80.

A roller bearing 372, carried by the slide bar 374 mounted on the slide frame 22, is urged by the spring 376 into engagement with the base cylinder 42 at a point diametrically opposite to the point of engagement of the bar 100 with said cylinder. A gear or other work piece having an involute tooth having been mounted between the centers 50 and 54, the two portions of the supporting frame 80 are adjusted vertically and horizontally to position the contactor 112 of the testing instrumentality 82 in contact with the involute surface to be inspected or tested. The adjusting means 200 of the testing instrumentality 82 is then operated to adjust the screens 132 and 134 relatively into their zero position, as illustrated in Fig. 18.

The several parts of the machine are so proportioned that the point of the contactor which engages the involute tooth of the gear carried between the centers 50 and 54 lies in a plane passing through the friction face of the driving bar 100 and is therefore tangent to the base cylinder 42, which plane is therefore of course tangent to the base cylinder 42 for the particular size of gear being inspected or tested. Hence, since the gear to be tested is rotated in strict proportion to the movement of the contact point along a plane tangent to the base circle of the gear, the contactor will not be deflected about its pivot stud 138 if the surface with which it is in contact is a true involute surface.

However, if the surface being tested is not a true involute surface, the contactor will be deflected about its pivot 138 to cause the corresponding proportional movement of the screen 132 relative to the screen 134. This relative movement of the screen 132 causes a proportional variation in the amount of illumination or quantum of rays transmitted through this screen and its complementary screen 134. The quantity of illumination to which the electro-optical or photo-electric cell 194 is subjected having been varied, the current which has been generated by the cell is correspondingly varied. The current supplied to the electric recording meter of the recorder unit 238 is therefore correspondingly varied to cause the recording scriber or pen 240 to assume a new position relative to the zero or base line 378 (Fig. 17) of the recording wheel 246. The record sheet 246 being fed synchronously with the horizontal movement of the frame 80, which causes the contactor to traverse the surface being tested, the pen will describe a curve accurately representative of the point-to-point deviations of the tested surface from the true involute.

The curve shown in Fig. 17 is of course exaggerated for the purpose of illustration. For each point on the tested surface which lies on the true involute curve, the pen 340 will be positioned on the zero or base line 378 of the chart, but for each point lying within or beyond the true involute curve the pen will be positioned above or below this base line. Accordingly, the line 378 constitutes the abscissa of the recorded curve. The length of the curve along this line is proportional to the length of the surface tested and the distance of any point on the curve above or below this line corresponds to the deviation of the corresponding point of the surface tested from the true involute curve.

In order to correlate the degree of rotation of the base cylinder and the gear or work piece being tested with the readings on the dial indicator 234, an indicator finger 380 (Figs. 1 and 3) is provided. One end of the finger 380 is bifurcated by arms 382 which are adapted to frictionally engage within a peripheral recess in the upper portion of the sleeve 32. As shown in Fig. 2, the frictional engagement between the arms 382 and the sleeve 32 is sufficient to hold securely the finger 380 in place but is sufficiently impositive to permit the finger to be manually shifted for purposes of adjustment. A suitable arcuate graduated scale 384 is secured to the slide frame 22. Before a test is started the finger or pointer 380 is first moved to zero position, as indicated in Fig. 3.

It will be seen from the foregoing description that applicant has provided a compact, inexpensive, efficient and highly sensitive involute tester and recorder, in which the testing or control unit may be used for recording instruments of various types, for remote control of airplanes and ships, and as part of height and depth measuring instruments, which tester is capable of use without special training and instruction.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. A tooth tester and recorder comprising a testing instrumentality including a supporting member, a tooth engaging testing contactor mounted on and shiftable relative to said supporting member and upon deviation of the tooth surface from the true tooth shape, and an electric gauge carried by said supporting member and responsive to the movement of the testing contactor relative to the supporting member, a work support member, means for shifting said work support member and said supporting member relatively to cause the testing contactor to traverse the surface of the tooth being tested, a recorder remote from said testing instrumentality and so supported as to be stationary during traversal of the tooth surface by the contactor, said recorder including an electrically operable scriber and means for feeding a record sheet to said scriber, means including an electric amplifier connected to the gauge and to the scriber of the remote recorder for causing the scriber to move across the record sheet distances which in magnitude are multiples of the movement of the testing contactor relative to the supporting member, and means connecting said sheet feeding means of the remote recorder to one of said members for operating the sheet feeding means in direct linear proportion to the extent of shifting of said one member.

2. A gear tooth tester and recorder comprising a testing instrumentality including a supporting member and a tooth engaging testing contactor mounted on and shiftable relative to said supporting member, a work support member, means for shifting said work support member and said contactor supporting member relatively to and fro to cause the testing contactor to traverse the surface of the tooth being tested, a stationary recorder remote from said work supporting member and said contactor supporting member, said recorder including a scriber and means for feeding a record sheet to said scriber, means operatively controlled by the testing contactor for operating the scriber in direct proportion to the extent of shifting of said testing contactor relative to its supporting member, and means connected to one of said members for driving said sheet feeding means by said one member, said driving and sheet feeding means being constructed to feed the record sheet in one direction past the scriber in amount directly proportional to the extent of shifting of said one member as the work support and the supporting member are relatively shifted to and fro.

3. A control unit comprising a support, a housing adjustably pivoted on the support, a light source and a light sensitive cell within said housing, a pair of arcuate light controlling screens concentric with the pivot axis of the housing, the first of the screens being fixed relative to the housing and the second screen being pivoted to the support for swinging about the common axis of the screens and the pivot axis of the housing, a member operatively connected to the second screen and projecting beyond the housing to receive a controlling force, and means for adjusting the housing relative to the support, said adjusting means comprising a rotatable shaft journaled in the housing and having an eccentric portion projecting beyond the housing, a fixed member having a slot to receive the eccentric portion of the shaft so that upon rotation of the shaft the housing will be shifted relative to the support to effect a zeroizing adjustment of the first screen relative to the second screen.

4. In a surface tester and recorder, means for supporting a work piece, the surface of which is to be tested, a testing instrumentality including a contactor adapted to traverse the surface to be tested and to be deflected laterally of its direction of traversal of the surface according to the contour of said surface, an electric gauge connected to said contactor for converting the mechanical deflections of said contactor into electrical variations, shiftable means for relatively moving the work piece and the testing instrumentality to cause the surface engaging contactor to traverse the surface, a recorder remote from said gauge and said shiftable means and so supported as to be stationary during traversal of the surface by said contactor, said recorder having an electrically operable marking member, means including an electric amplifier connected to said gauge for amplifying said electrical variations and connected to said marking member of the remote recorder for moving said marking member distances which in magnitude are multiples of the mechanical deflections of said contactor, said recorder including means for feeding the record sheet past said marking member, and means connecting said moving means to said sheet feeding means of the remote recorder for driving said sheet, said driving means and said sheet feeding means being constructed to feed the sheet past the marking member in direct proportion to the extent of movement of said shiftable means.

5. In a surface tester and recorder, means for supporting a work piece, a surface of which is to be tested, a testing instrumentality having a member adapted to engage said surface, shiftable means for rectilinearly moving said testing instrumentality to cause said member to traverse said surface, a recorder having a marking member operatively connected to said testing instrumentality and movable means for feeding a record sheet past said marking member, and means connecting said shiftable means to said sheet feeding means for driving said sheet feeding means in proportion to the rectilinear movement of said testing instrumentality, said driving means including a mechanism for so driving said sheet feeding means as to feed the sheet in the same direction past the marking member independently of the direction of rectilinear movement of the testing instrumentality.

6. A surface tester including a work support, a ray source, a ray controlling shutter, means including a test support and a test member shiftably mounted on said test support, means for moving said test support and said work support relatively to cause said test member and the surface of the work piece to be tested to move relatively along a path determined by the desired shape of said surface, said test member being shiftable relative to the test support in response to the deviation of the tested surface from its desired shape, means operatively connecting said test member to said shutter member for shifting said shutter member proportionately to the shifting of said test member relative to its support, an electro-optical cell responsive to the ray controlled by said shutter member for producing an electric current varying in proportion to the shifting of said test member relative to its support, and means operated by said varying electric current for manifesting the variations of said electric current whereby to indicate the deviations of the tested surface from its desired shape.

7. A tooth tester including a testing member, a support upon which said member is shiftably mounted, means for shifting said support and the tooth relatively to cause the testing member to traverse the surface of the tooth and be shifted by said tooth surface relative to its support in response to the deviation of the tooth surface from the true tooth shape, a ray source fixed relative to said support, a ray controlling shutter device including a shiftable shutter member operatively connected to said testing member for movement relative to said support in proportion to the distance of movement of said testing member relative to the support, an electro-optical cell fixed relative to said support and responsive to the ray controlled by said device for producing an electric current varying in proportion to the movement of said testing member relative to the support, and means operated by said varying electric current for manifesting the distance of movement of the testing member relative to the support.

8. A contour testing control unit comprising a shiftable support, a light source and a light sensitive cell fixed relative to said support, a pair of light controlling screens interposed between the light source and the light sensitive cell, said screens having juxtaposed convex and concave surfaces curved about a common axis, each of said surfaces having alternate light transmitting and light interrupting portions parallel to each other and to said common axis, light opaque portions of one screen being staggered with respect to the light opaque portions of the other screen so that the light opaque portion of one screen extends from a point overlapping the light opaque portion of the other screen to a point centrally of the light transmitting portion of said other screen when said screens are in neutral position, the first of the screens being fixed relative to the support and the second screen being shiftably mounted on the support for swinging movement about the common axis to increase and decrease the light transmitted by the pair of screens in accordance with the direction and distance of movement of the second screen, a surface engaging test member mounted on said support for movement therewith and relative thereto, means for shifting said support to carry said test member across the surface to be tested along a path determined by the desired contour of the surface being tested, said testing member being shifted relative to said support upon deviation of the surface from the desired shape, means operatively connecting the test member to the second screen for swinging this screen upon movement of the test member relative to the support and in proportion to the distance of movement of said member, and means controlled by the light sensitive cell for manifesting the distance of movement of the test member relative to the support.

9. A contour testing control unit comprising a shiftable support, a light source and a light sensitive cell fixed relative to said support, a pair of light controlling screens interposed between the light source and the light sensitive cell, said screens having juxtaposed convex and concave surfaces curved about a common axis, each of said surfaces having alternate light transmitting and light interrupting portions parallel to each other and to said common axis, light opaque portions of one screen being staggered with respect to the light opaque portions of the other screen so that the light opaque portion of one screen extends from a point overlapping the light opaque portion of the other screen to a point centrally of the light transmitting portion of said other screen when said screens are in neutral position, the first of the screens being fixed relative to the support and the second screen being shiftably mounted on the support for swinging movement about the common axis to increase and decrease the light transmitted by the pair of screens in accordance with the direction and distance of movement of the second screen, a surface engaging test member mounted on said support for movement therewith and relative thereto, means for shifting said support to carry said test member across the surface to be tested along a path determined by the desired contour of the surface being tested, said testing member being shifted relative to said support upon deviation of the surface from the desired shape, means operatively connecting the test member to the second screen for swinging this screen upon movement of the test member relative to the support and in proportion to the distance of movement of said member, means controlled by the light sensitive cell for manifesting the distance of movement of the test member relative to the support, and means for adjusting the shiftable support relative to the test member to adjust the first screen into neutral position relative to the second screen.

10. A contour testing control unit comprising a shiftable support, a housing pivoted on the support, a light source and a light sensitive cell fixed relative to said housing, a pair of light controlling screens interposed between the light source and the light sensitive cell, said screens having juxtaposed convex and concave surfaces concentric to the pivot axis of the housing, each of said screens having alternate light transmitting and light interrupting portions parallel to each other and to said pivot axis, the first of the screens being fixed relative to the housing and the second screen being pivoted to the support about an axis concentric to the pivot axis of the housing, a surface engaging test member operatively connected to the second screen for swinging movement about the same axis, means for shifting the support along a predetermined path to cause this test member to traverse a path determined by the desired shape of the surface to be tested, said test member swinging relative to the support and the housing upon deviation of the tested surface from the desired shape, means for pivoting the housing relative to the support to adjust the first screen into neutral position with respect to the second screen, in which position one-half of the light transmitting portion of each screen is overlapped by a light opaque portion of the other screen, so that upon swinging of the test member relative to the housing, the quantum of light falling upon the light sensitive cell will be varied in accordance with the direction of movement of the test member and in proportion to the distance of movement of said member relative to the housing, and means operatively connected to the light sensitive cell for manifesting the direction and amount of variation of the surface tested from the desired shape.

11. A contour testing control unit comprising a shiftable support, a housing pivoted on the support, a light source and a light sensitive cell fixed relative to said housing, a pair of light controlling screens interposed between the light source and the light sensitive cell, said screens having juxtaposed convex and concave surfaces concentric to the pivot axis of the housing, each of said screens having alternate light transmitting and light interrupting portions parallel to each other and to said pivot axis, the first of the screens being fixed relative to the housing and the second screen being pivoted to the support about an axis concentric to the pivot axis of the housing, a surface engaging test member operatively connected to the second screen for swinging movement about the same axis, means for shifting the support along a predetermined path to cause this test member to traverse a path determined by the desired shape of the surface to be tested, said test member swinging relative to the support and the housing upon deviation of the tested surface from the desired shape, means for pivoting the housing relative to the support to adjust the first screen into neutral position with respect to the second screen, in which position one-half of the light transmitting portion of each screen is overlapped by a light opaque portion of the other screen, so that upon swinging of the test member relative to the housing, the quantum of light falling upon the light sensitive cell will be varied in accordance with the direction of movement of the test member and in proportion to the distance of movement of said member relative to the housing and means operatively connected to the light sensitive cell for manifesting the direction and amount of variation of the surface tested from the desired shape, said adjusting means comprising a rotatable shaft journalled in the housing and having an eccentric portion projecting beyond the housing, a member fixed to the support and having a slot to receive the eccentric portion of the shaft so that upon rotation of the shaft the housing will be adjusted about its pivot axis relative to the support.

12. In a tooth surface tester and recorder, means for supporting a work piece having a tooth the surface of which is to be tested, a testing instrumentality having a shiftable test support and a test member shiftably mounted thereon and adapted to engage said tooth surface, means for rectilinearly moving said test support and rotating said work piece to cause said test member to traverse said surface and be deflected by the deviation of the tooth surface from a standard tooth surface, a recorder having a marking member operatively connected to said test member and means for feeding a record sheet past said marking member, and means connecting said moving means to said sheet feeding means for feeding said sheet in proportion to the rectilinear movement of said test support, said testing instrumentality comprising a light source and a light sensitive cell carried by said test support and a pair of light controlling screens, one of which is fixed relative to said light source in said cell and the other of which is connected to said test member for movement relative to the first screen upon deviation of the test member.

13. In a surface tester and recorder, means for supporting a work piece, the surface of which is to be tested, a testing instrumentality including a contactor adapted to traverse the surface to be tested and to be deflected laterally of its direction of traversal of the surface according to the contour of said surface, an electric gauge connected to said contactor for converting the mechanical deflections of said contactor into electrical variations, shiftable means for relatively moving the work piece and the testing instrumentality to cause the surface engaging contactor to traverse the surface, a recorder remote from said gauge and said shiftable means and so supported as to be stationary during traversal of the surface by said contactor, said recorder having an electrically operable marking member, means electrically connecting said gauge to said marking member of the remote recorder for moving said marking member distances which in magnitude are multiples of the mechanical deflections of said contactor, said recorder including means for feeding the record sheet past said marking member, and means connecting said shiftable means to said sheet feeding means of the remote recorder for driving said sheet, said driving means and said sheet feeding means being constructed to feed the sheet past the marking member in direct proportion to the extent of movement of said shiftable means.

OUGLJESA JULES POUPITCH.